May 7, 1946.　　R. A. GOEPFRICH　　2,400,043
BRAKE CONSTRUCTION
Filed Dec. 13, 1944　　2 Sheets-Sheet 1

INVENTOR.
RUDOLPH A. GOEPFRICH
BY
T. J. Plante

May 7, 1946.  R. A. GOEPFRICH  2,400,043
BRAKE CONSTRUCTION
Filed Dec. 13, 1944   2 Sheets-Sheet 2

INVENTOR.
RUDOLPH A. GOEPFRICH
BY
T. J. Plante

Patented May 7, 1946

2,400,043

UNITED STATES PATENT OFFICE 2,400,043

BRAKE CONSTRUCTION

Rudolph A. Goepfrich, South Bend, Ind.

Application December 13, 1944, Serial No. 567,936

4 Claims. (Cl. 188—152)

This invention relates to brake construction.

The principal object of the invention is to provide an improved brake structure which will be relatively simple and inexpensive to manufacture and will possess to a high degree the required attributes of strength, compactness and reliability.

Figure 1:
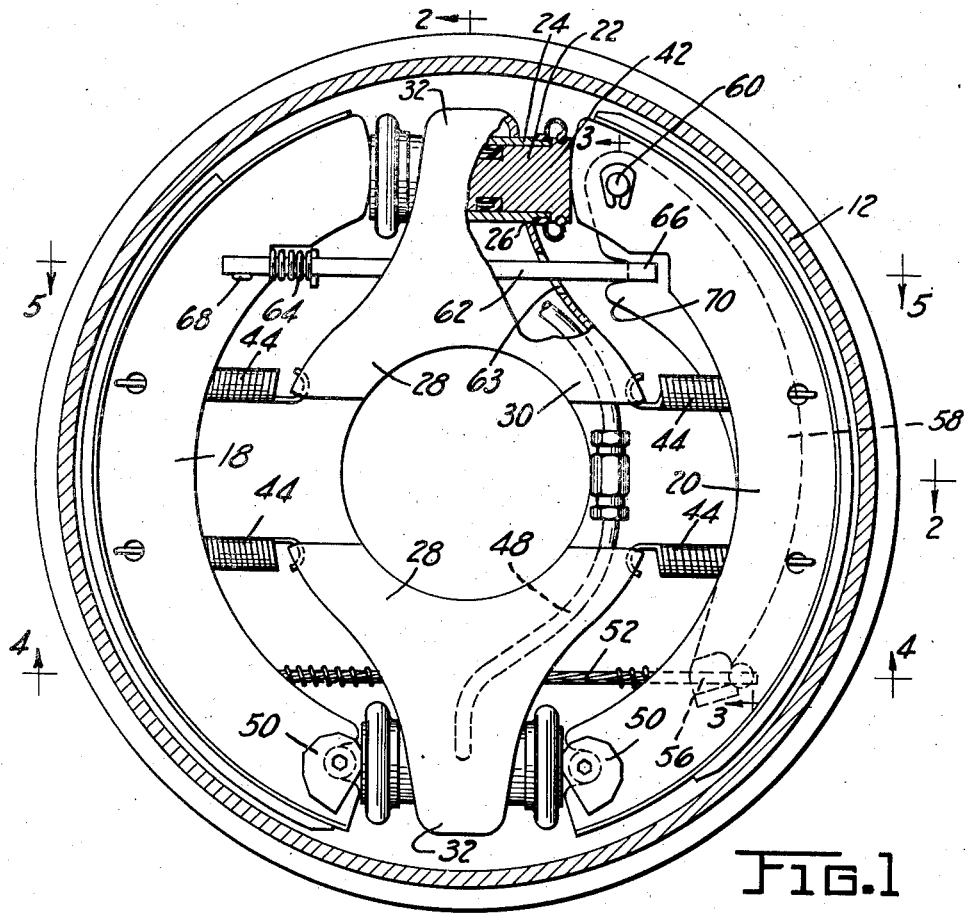
Figure 4:
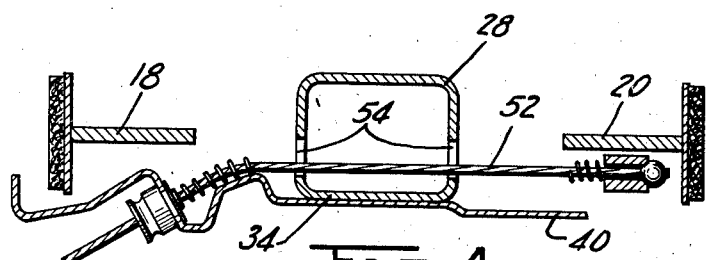

Other objects and advantages of the invention will become apparent during the course of the following description, reference being had therein to the accompanying drawings, in which:

Figure 1 is a side elevation showing the various parts of a brake structure in assembled relation; and Figures 2, 3, 4 and 5 are sections taken on the lines 2—2, 3—3, 4—4 and 5—5, respectively, of Figure 1.

Referring to the drawings, the cylindrical braking flange 12 of a brake drum 14, which is secured to a rotating axle 16, is adapted to be slowed or stopped by means of the usual brake shoes 18 and 20. The brake shoes are adapted to be moved into contact with the drum by means of hydraulically actuated pistons 22. In the illustrated arrangement, an applying piston is provided at each end of each shoe, but this particular arrangement is not directly associated with the present invention, and is only intended to show a possible type of brake actuation.

Practically all conventional wheel cylinders are formed by casting and subsequently machining the cast structure, which is quite expensive and time consuming. I propose to simplify the construction of wheel cylinders by utilizing tubing cut to the desired length and supported by suitable means in the brake assembly.

Referring particularly to Figure 1, the pistons 22 are reciprocable in a tube or tubes 24 which extend through aligned openings 26 formed in opposite sides of a box section member 28. The tubes 24 are preferably welded (this includes hydrogen brazing, the most likely process) to each of the side walls of the respective box section member 28. The box section members 28 are deep drawn stampings having a relatively wide inner portion 30 and a much narrower portion 32 extending radially outwardly from the inner portion 30. The rear wall 34 of each of the box section members 28 is secured by suitable means to a fixed part of the vehicle, such as the axle housing 36 (see particularly Figure 2), a plurality of holes 38 being provided in the rear wall 34 of each box section stamping near the innermost edge thereof, in order to accommodate suitable fastenings. The same bolts or the like which fasten wall 34 to a fixed part of the vehicle may also fasten a cover plate 40 thereto, said cover plate cooperating with the cylindrical flange on the brake drum to keep substantially all dirt and other foreign matter out of the brake assembly.

Since it is intended that the anchoring torque of the shoes 18 and 20 be transmitted to a fixed part of the vehicle through the tubes 24 and the support members 28, it is important that the structure be sufficiently strong to withstand the torque. For this reason the box section support or torque reaction members are utilized and the tubes 24 are welded to both sides of said box section members at the edges of the openings 26. In the illustrated brake, the anchoring torque of the shoes is transmitted to the tubes 24 by means of flanges 42 formed on the pistons 22.

The construction of support members 28 and tubes 24, and the manner of combining said tubes and support members have several important advantages. Since the tubes are brazed to the walls of the support members which lie in planes transverse to the axis of the tube, the strongest possible connection is obtained with the welded construction, or in other words, the surface over which the weld extends is as large as possible. Furthermore, the box section structure of the support members 28 provides a strong torque reaction means, and at the same time a relatively inexpensive structure because the members 28 can be made by means of stamping.

A plurality of return springs 44 are in tension between the edges of the box section support members 28 and the webs of the shoes 18 and 20, thereby normally maintaining the shoes in released position.

An inlet fitting 46 is provided for the upper tube 24, while a bleeder fitting (not shown) is provided for the lower tube 24. The two tubes are interconnected by a conduit 48. Preferably the conduit 48 and the inlet and bleeder fittings are brazed to the cylinder tubes at the same time that the tubes are brazed (or otherwise welded) to the side walls of the box section supporting members 28. It is preferable to secure the fittings to the cylinder tubes by welding, since the wall section of the tubes is not sufficiently thick to provide a threaded opening.

Adjusting members 50 are provided for the shoes. These members may, as shown, be made according to the principles of Goepfrich and House application Serial No. 502,858, filed September 18, 1943. The adjustors 50 are preferably both located at the lower ends of the shoes, in order that their manipulation will not disturb the mechanical parking brake mechanism, which will now be described.

Figure 3:
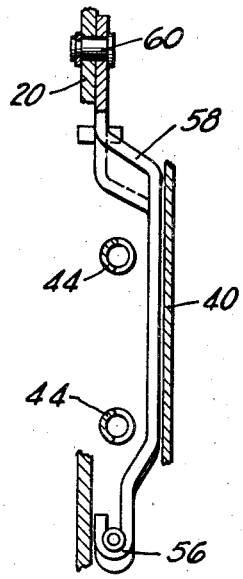
Figure 2:
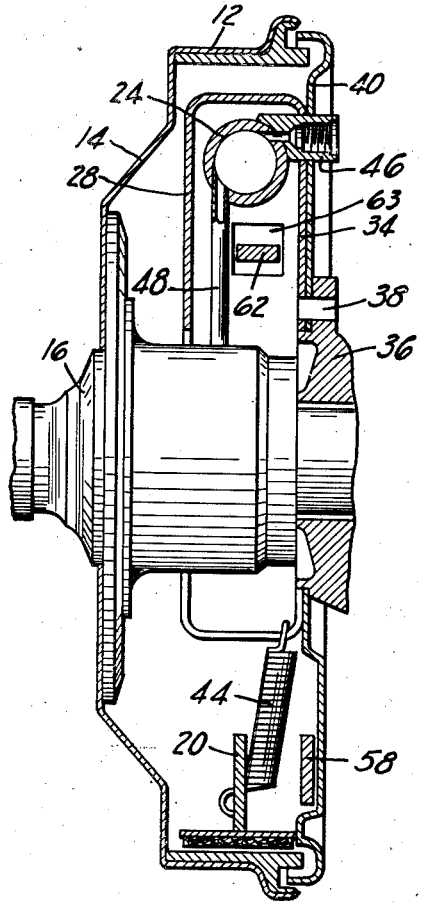
Figure 5:
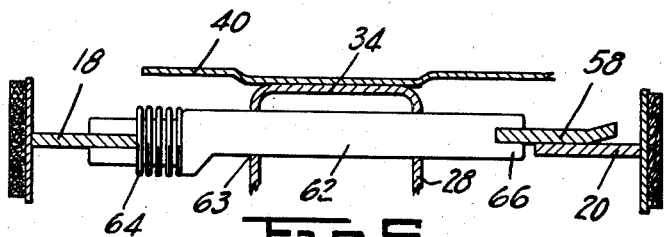

The parking brake mechanism comprises cable 52 which extends through openings 54 in the side walls of the lower box section member 28, and which is connected to the lower end 56 of a lever 58. The lever 58 is mounted on a pin 60 journaled in the web of brake shoe 20, and the lever is pivotally connected intermediate its ends with strut 62 extending through openings 63 in the sides of upper support member 28, said strut acting through spring 64 against the web of shoe 18, spring 64 being provided to insure that the forked right end 66 of strut 62 will remain in proper position relative to lever 58. The left end of strut 62 is vertically supported by a nib 68 on the web of shoe 18, while the right end of the strut is supported by an ear 70 formed on lever 58. The center portion of the lever is bent away from the plane of the brake shoe web to provide room for the springs 46, as illustrated in Figure 3.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. A brake structure comprising an open-ended box-section stamping having a gradually enlarging width dimension approaching the open end, one wall of said stamping near the enlarged open end being secured to a fixed part of the vehicle, the narrowing portion of said stamping extending radially outwardly and having aligned openings through opposite side walls thereof, and a tube extending through said openings and brazed to the side walls of the stamping.

2. A brake structure comprising a drum, an open-ended box-section stamping having a gradually enlarging width dimension approaching the open end, one wall of said stamping near the enlarged open end being secured to a fixed part of the vehicle, the narrowing portion of said stamping extending radially outwardly and having aligned openings through opposite side walls thereof, a tube extending through said openings and brazed to the side walls of the stamping, a piston reciprocable in the tube and having a shoulder adapted to anchor on the tube wall, and a shoe adapted to be applied by the piston in one direction of drum rotation and to anchor through the piston and tube in the other direction of drum rotation.

3. A brake structure comprising an open-ended box-section stamping having a gradually enlarging width dimension approaching the open end, one wall of said stamping near the enlarged open end being arranged to be secured to a fixed part of the vehicle, the narrowing portion of said stamping extending radially outwardly and having aligned openings through opposite walls thereof, and a hydraulic wheel cylinder extending through said openings and supported by said box-section stamping.

4. A brake structure comprising an open-ended box-section member having a gradually enlarging width dimension approaching the open end, one wall of said member near the enlarged open end being arranged to be secured to a fixed part of the vehicle, the narrowing portion of said member extending radially outwardly and having aligned openings through opposite walls thereof, and a hydraulic wheel cylinder extending through said openings and supported by said box-section member.

RUDOLPH A. GOEPFRICH.